United States Patent
Katori et al.

(10) Patent No.: US 9,693,305 B2
(45) Date of Patent: Jun. 27, 2017

(54) COMMUNICATION CONTROL DEVICE, COMMUNICATION CONTROL METHOD, AND RECORDING MEDIUM

(71) Applicant: SONY CORPORATION, Tokyo (JP)

(72) Inventors: Tomohiro Katori, Tokyo (JP); Nobuhiro Kaneko, Kanagawa (JP); Hui Peng, Tokyo (JP); Satoru Iwasaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 97 days.

(21) Appl. No.: 14/662,907

(22) Filed: Mar. 19, 2015

(65) Prior Publication Data
US 2015/0282084 A1 Oct. 1, 2015

(30) Foreign Application Priority Data
Mar. 28, 2014 (JP) .................. 2014-069160

(51) Int. Cl.
*H04W 52/02* (2009.01)
(52) U.S. Cl.
CPC ......... *H04W 52/0225* (2013.01); *Y02B 60/50* (2013.01)
(58) Field of Classification Search
CPC ...................... H04W 52/0225; H02B 60/50
See application file for complete search history.

(56) References Cited

U.S. PATENT DOCUMENTS

| 8,209,291 B1* | 6/2012 | Ma | G06F 17/30442 |
| | | | 707/641 |
| 2007/0130428 A1* | 6/2007 | Ohba | G06F 9/3802 |
| | | | 711/137 |
| 2013/0176846 A1* | 7/2013 | Callard | H04L 67/06 |
| | | | 370/230 |
| 2015/0012608 A1* | 1/2015 | Ishikawa | G06F 17/3089 |
| | | | 709/213 |
| 2015/0271287 A1* | 9/2015 | Islam | H04L 67/2847 |
| | | | 711/137 |

FOREIGN PATENT DOCUMENTS

JP 2009-153078 A 7/2009

* cited by examiner

*Primary Examiner* — Albert T Chou
(74) *Attorney, Agent, or Firm* — Chip Law Group

(57) ABSTRACT

There is provided a communication control device including a prefetch controller configured to allow data corresponding to a target of processing to be prefetched through a communication based on information relating to a prefetch of data when a communication for an application being executed is performed in a connection state of being connected to an external device, the target of processing being different from the application being executed.

19 Claims, 10 Drawing Sheets

| APPLICATION | PREFETCH PROCESS | ESTIMATED BANDWIDTH USAGE AMOUNT | DEGREE OF EFFECTIVENESS OF PREFETCH | DEGREE OF PRIORITY | RE-EXECUTION REQUEST |
|---|---|---|---|---|---|
| A | func A | ~10kB/s | 80 | 1 | UNNECESSARY |
| B | func B | ~500kB/s | 20 | 1 | NECESSARY |
| C | func C | ~10kB/s | 20 | 2 | — |
| D | func D | ~1MB/s | 20 | 3 | — |
| ⋮ | ⋮ | ⋮ | ⋮ | ⋮ | ⋮ |

| PREFETCHED DATA |
|---|
| − RECEIVED DATA |
| − RECEIVED DATA AMOUNT |
| − ACCESSED DATA AMOUNT |
| + DATA ACQUISITION ( ) | ably described above.

COMMUNICATION CONTROL DEVICE, COMMUNICATION CONTROL METHOD, AND RECORDING MEDIUM

CROSS REFERENCE TO RELATED APPLICATIONS

This application claims the benefit of Japanese Priority Patent Application JP 2014-069160 filed Mar. 28, 2014, the entire contents of which are incorporated herein by reference.

BACKGROUND

The present disclosure relates to a communication control device, a communication control method, and a recording medium.

Techniques for prefetching data through communication with external devices have been developed. The techniques for prefetching data are exemplified by the technique disclosed in JP 2009-153078A.

SUMMARY

Reduction in power consumption during communication is desired. According to an embodiment of the present disclosure, there is provided a novel and improved communication control device, communication control method, and recording medium, capable of reducing power consumed to maintain a connection state of being connected to an external device.

According to an embodiment of the present disclosure, there is provided a communication control device including a prefetch controller configured to allow data corresponding to a target of processing to be prefetched through a communication based on information relating to a prefetch of data when a communication for an application being executed is performed in a connection state of being connected to an external device, the target of processing being different from the application being executed.

According to another embodiment of the present disclosure, there is provided a communication control method that is executed by a communication control device, the method including allowing data corresponding to a target of processing to be prefetched through a communication based on information relating to a prefetch of data when a communication for an application being executed is performed in a connection state of being connected to an external device, the target of processing being different from the application being executed.

According to still another embodiment of the present disclosure, there is provided a non-transitory computer-readable recording medium having a program recorded thereon, the program causing a computer to execute the function of allowing data corresponding to a target of processing to be prefetched through a communication based on information relating to a prefetch of data when a communication for an application being executed is performed in a connection state of being connected to an external device, the target of processing being different from the application being executed.

According to an embodiment of the present disclosure, it is possible to reduce power consumed to maintain a connection state of being connected to an external device.

Note that the advantageous effects described above are not necessarily intended to be restrictive, and any other advantageous effects described herein and other advantageous effects that will be understood herein may be attained, in addition to or instead of the advantageous described above.

DETAILED DESCRIPTION OF THE EMBODIMENT(S)

Figure 1:
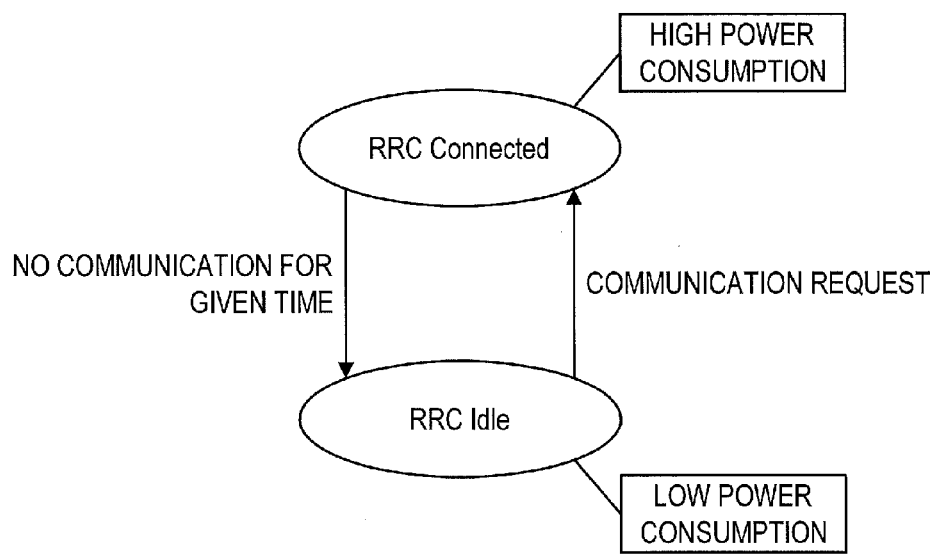
FIG. 1 is an explanatory diagram illustrated to describe a communication control method according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Communication control method according to present embodiment
2. Communication control device according to present embodiment
3. Program according to present embodiment (Communication Control Method According to Present Embodiment)

A communication control method according to the present embodiment will be described and then the configuration of a communication control device according to the present embodiment will be described. The communication control method according to the present embodiment will be described by taking a case in which a process performed by the communication control method according to the present embodiment is performed by the communication control device according to the present embodiment as an example.
Overview of Processing by Communication Control Method According to Present Embodiment For example, a communication device (for example, smartphones) for communication such as packet-based communication consumes the power even when data such as a packet is not transmitted or received. The power consumed is not fixed. Specifically, the power consumption is high in the state in which data transmission and reception from and to an external device such as a base station are typically performed. Meanwhile, the power consumption is low in the state in which a connection process for connection with the external device is necessary to be performed prior to the beginning of data transmission and reception, that is, an idle state.

FIG. 1 is an explanatory diagram illustrated to describe the communication control method according to the present embodiment. FIG. 1 illustrates an example of the state of a communication device in the case of using long-term evolution (LTE). As shown in FIG. 1, the "RRC Connected" refers to the state in which data transmission and reception from and to an external device such as a base station are typically performed. The "RRC Idle" refers to the state in which a connection process is necessary to be performed prior to the beginning of data transmission and reception, that is, an idle state.

The occurrence of transmission and reception of data is more likely to be followed by transmission and reception of other data. Thus, in the case of using LTE, when the communication device is in "RRC Connected" state, "RRC Connected" state is maintained for a predetermined period of time (for example, several tens of seconds) even if the transmission and reception of data is not performed. If the transmission and reception of data is not performed until a predetermined period of time has elapsed, a transition into "RRC Idle" state is performed.

In the above, the description is made on the case in which LTE is used. Even when third generation (3G) technology is used, the same is true for the power consumption except that a change in the state is different between LTE and 3G. Specifically, power consumption is high in the connection state and is low in the disconnection state corresponding to the idle state, and the connection is kept to be established for a given period of time.

Figure 2:
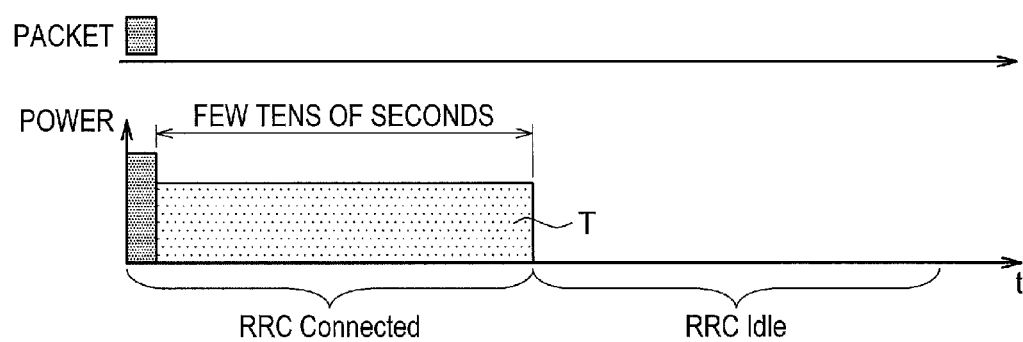
FIG. 2 is an explanatory diagram illustrated to describe the communication control method according to the present embodiment.

FIG. 2 is an explanatory diagram illustrated to describe the communication control method according to the present embodiment. FIG. 2 schematically illustrates the power consumed during the transmission of a given packet (an example of data) by the communication device having the characteristics shown with reference to FIG. 1.

As shown by the reference character T in FIG. 2, the power for maintaining a connection that is subsequent to the transmission and reception of data is consumed in the communication device. The phrase "power for maintaining a connection occurred subsequent to transmission and reception of data" is referred to as "tail energy" hereinafter.

The communication control device according to the present embodiment may reduce the tail energy, thereby reducing the power consumed to maintain the connection state of being connected to an external device.

The connection state according to the present embodiment refers to a state in which communication with an external device can be performed without the necessity of pre-processing for performing communication such as a connection process for establishment of a connection with the external device. The connection state according to the present embodiment may include the "RRC Connected" state shown in FIG. 1.

The state other than the connection state according to the present embodiment is sometimes referred to as "non-connection state" hereinafter. The non-connection state according to the present embodiment may include the "RRC Idle" state shown in FIG. 1.

When communication for an application being executed in the connection state is performed as a process performed by the communication control method according to the present embodiment, the communication control device according to the present embodiment allows data corresponding to a target of processing to be prefetched through communication. The application being executed is sometimes referred to as "application in use" hereinafter.

The application in use according to the present embodiment may include an application that is executed manually based on the user operation and an application that is executed regardless of the user operation.

The target of processing according to the present embodiment may include an application by which data is prefetched and a process by which data is prefetched in the application. The application to be processed and the process in the application according to the present embodiment are different from the application in use and the process of the application in use, respectively.

Figures 3, 4:
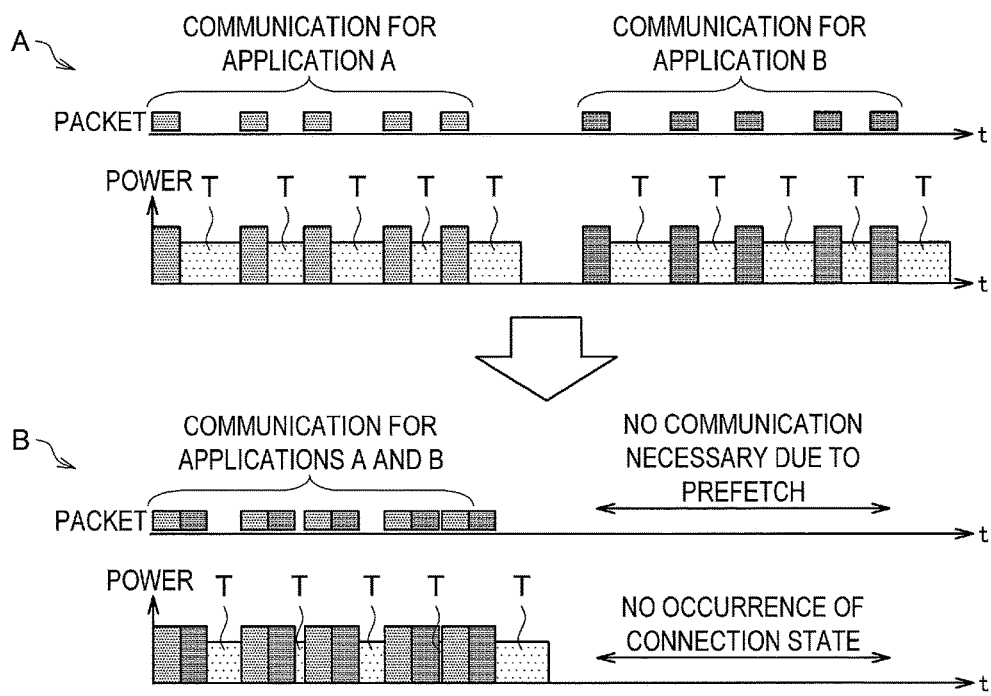
FIG. 3 is an explanatory diagram illustrated to describe the communication control method according to the present embodiment.
FIG. 4 is an explanatory diagram illustrated to describe an example of information relating to prefetch of data according to the present embodiment.

FIG. 3 is an explanatory diagram illustrated to describe the communication control method according to the present embodiment. The portion A in FIG. 3 schematically illustrates an example of the communication and power consumption in the case where a process of the communication control method according to the present embodiment is not performed. The portion B in FIG. 3 schematically illustrates an example of the communication and power consumption in the case where a process of the communication control method according to the present embodiment is performed.

The reference character "T" shown in the portions A and B of FIG. 3 indicates the tail energy. In the portion B of FIG. 3, the application A corresponds to the application in use, and the application B corresponds to the target of processing.

As shown in the portion B of FIG. 3, the process performed by the communication control method according to the present embodiment allows data of the application B, which is a target of processing, to be prefetched during communication with the application A that is the application in use.

The prefetch performed by the process in the communication control method according to the present embodiment eliminates the necessity of communication of the application B, which is performed separately from communication of the application A in the example shown in the portion A of FIG. 3. Thus, as shown in the portions A and B of FIG. 3, the process performed by the communication control method according to the present embodiment reduces the total amount of the tail energy T being consumed.

The process of the communication control method according to the present embodiment performed by the communication control device according to the present embodiment allows the power consumed to maintain the connection state of being connected to an external device to be reduced.

An example of prefetch of data implemented by the process of the communication control method according to the present embodiment is not limited to the example shown in the portion B of FIG. 3. For example, the communication control device according to the present embodiment can perform the communication for the application in use and the communication for the prefetch of a target of processing in parallel at the same timing.

Process for Communication Control Method According to Present Embodiment

The process of the communication control method according to the present embodiment will be described in more detail. The communication control device according to the present embodiment can perform prefetch control process described below, and thus the prefetch of data as shown in the portion B of FIG. 3 is performed, resulting in the reduction of the power consumed to maintain the connection state.

(1) Prefetch Control Process

For example, when communication for an application in use is performed in the connection state, the communication control device according to the present embodiment allows data, which corresponds to a target of processing, to be prefetched through communication based on information relating to prefetch of data.

The communication control device according to the present embodiment allows data corresponding to a target of processing to be prefetched by allowing a communication unit (described later) included in the communication control device according to the present embodiment or an external communication device connected to the communication control device according to the present embodiment to transmit a data transmission request to an external device corresponding to a target of processing. The data transmission request according to the present embodiment may include an instruction for data transmission and information indicating data to be transmitted (for example, data indicating a data name of data to be transmitted).

The information relating to prefetch of data according to the present embodiment is data to be referred to when data is prefetched by the communication control device according to the present embodiment. An example of the process using the information relating to prefetch of data according to the present embodiment will be described later.

FIG. 4 is an explanatory diagram illustrated to describe an example of the information relating to prefetch of data according to the present embodiment. A variety of values are set to the information relating to prefetch of data according to the present embodiment for each target candidate of processing (hereinafter, referred to as "target candidate of processing").

The portion A in FIG. 4 indicates an example of the target candidate of processing according to the present embodiment. The target candidate of processing according to the present embodiment may include a process in which prefetch is performed in an application as shown in the portion A of FIG. 4.

The target candidate of processing according to the present embodiment is not limited to the example shown in the portion A of FIG. 4. For example, the target candidate of processing may be an application. When the target candidate of processing according to the present embodiment is a process in which prefetch is performed in an application, different processes in the same application may be target candidates for processing.

The portions B to E of FIG. 4 are examples of a value that is set to the information relating to prefetch of data. For example, a bandwidth usage amount of communication necessary to perform prefetch of data (portion B of FIG. 4), a degree of effectiveness indicating how effective prefetch is (portion C of FIG. 4), a degree of priority indicating a priority order of the prefetch (portion D of FIG. 4), and a re-execution request value indicating whether the prefetch is to be performed repeatedly (portion E of FIG. 4) are set to the information relating to prefetch of data.

The setting of a target candidate of processing to the information relating to prefetch of data is performed, for example, when an application is installed. The setting of a target candidate of processing to the information relating to prefetch of data may be performed, for example, based on the user operation or the like for setting it to the information relating to prefetch of data.

The bandwidth usage amount shown in the portion B of FIG. 4 is, for example, a bandwidth usage amount obtained by estimating the use of the target candidate of processing (an application or a process in the application) during communication. The bandwidth usage amount shown in the portion B of FIG. 4 is set to the information relating to prefetch of data, for example, when a target candidate of processing is set to the information relating to prefetch of data. The bandwidth usage amount for each target candidate of processing set to the information relating to prefetch of data may be updated in such a way as follows:

Bandwidth usage amount is updated based on the results learned from the bandwidth usage amount obtained when the prefetch was performed in the past.

Bandwidth usage amount is updated into an estimated value of the bandwidth usage amount, which is estimated when prefetch of a target of processing is completed and is obtained when data of processing is prefetched again (for example, when a link to image data is included in the current prefetched data and the image data is obtained from the subsequent prefetch process, the bandwidth usage amount is necessary when the size of the estimated image data is obtained is an estimated value of the bandwidth usage amount).

The degree of effectiveness according to the present embodiment is, for example, an index representing an effect that can reduce the power consumption (effectiveness of prefetch) through the prefetch. The degree of effectiveness shown in the portion C of FIG. 4 is set to the information relating to prefetch of data, for example, when the target candidate of processing is set to the information relating to prefetch of data. The degree of effectiveness for each target candidate of processing set to the information relating to prefetch of data may be updated, for example, based on the results learned from the power reduced by the prefetch of data.

The degree of priority according to the present embodiment is, for example, an index representing the order of priority in which the prefetch is performed. The degree of priority shown in the portion D of FIG. 4 is set to the information relating to prefetch of data, for example, when the target candidate of processing is set to the information relating to prefetch of data. The degree of priority for each target candidate of processing may be set to the information relating to prefetch of data, for example, based on an operation performed by the user who sets the degree of priority.

In order to reduce the influence of the application in use on the communication, the prefetch process is assumed to be implemented in such a way that the duration of one process is completed in a short time. The implementation assumed in such a way as described above means that the prefetch process is not considered to be completed with only one prefetch process (for example, a case in which 10 elements are prefetched from a new feed and the process is completed, but further 20 elements remain to be prefetched). The re-execution request value is, for example, a value indicating whether the prefetch process is completed with one prefetch process. The re-execution request value shown in the portion E of FIG. 4 is set to the information relating to prefetch of data, for example, when the prefetch process is performed on a target of processing. The re-execution request value shown in the portion E of FIG. 4 may be set to the information relating to prefetch of data, for example, when a target candidate of processing is set to the information relating to prefetch of data.

The value to be set to the information relating to prefetch of data is not limited to the example shown in FIG. 4. For example, one or more of the items including the bandwidth usage amount of communication necessary to perform the prefetch of data (portion B of FIG. 4), the degree of effectiveness indicating how effective the prefetch is (portion C of FIG. 4), the degree of priority indicating a priority order of the prefetch (portion D of FIG. 4), and the re-execution request value indicating whether the prefetch is to be performed repeatedly (portion E of FIG. 4) may be set to the information relating to prefetch of data according to the present embodiment.

The information relating to prefetch of data is managed by allowing the communication control device according to the present embodiment to perform a management process that will be described later. The information relating to prefetch of data may be managed by an external device of the communication control device according to the present embodiment.

The information relating to an external device may be associated with the information relating to prefetch of data according to the present embodiment. This association may be performed for each target of processing. The information relating to prefetch of data according to the present embodiment includes, for example, any data that can specify an external device corresponding to a target candidate of processing such as Internet protocol (IP) address or media access control (MAC) address of the external device.

The communication control device according to the present embodiment decides a target of processing from among target candidates of processing based on the information relating to prefetch as shown in FIG. 4. Then, the communication control device according to the present embodiment allows data corresponding to the decided target of processing to be prefetched.

Specifically, the communication control device according to the present embodiment performs, for example, items (i) to (v) described below based on the information relating to prefetch.

(i) First Example of Prefetch Control Process: Process Performed in a Case in which the Bandwidth Usage Amount for Each Target Candidate of Processing is Set to the Information Relating to Prefetch As described above, when the communication control device according to the present embodiment allows data of a target of processing to be prefetched, the communication control device can perform the communication for the application in use and the communication for the prefetch of a target of processing in parallel at the same timing. When the communication for the application in use and the communication for the prefetch of a target of processing are performed in parallel at the same timing, the bandwidth usage rate of communication can be increased and the communication can be completed in a shorter time, and additionally, the power consumed to maintain the connection state can be reduced.

However, a communication unit (described later) or an external communication device has a limited bandwidth for communication. Thus, if the bandwidth usage rate in the communication for the prefetch of a target of processing is excessively high, the communication for an application in use is likely to be disturbed. If the communication for an application in use is disturbed, delay occurs in the communication for an application in use, which may cause a negative effect on the usability (or user experience), such as longer waiting time.

Figure 5:
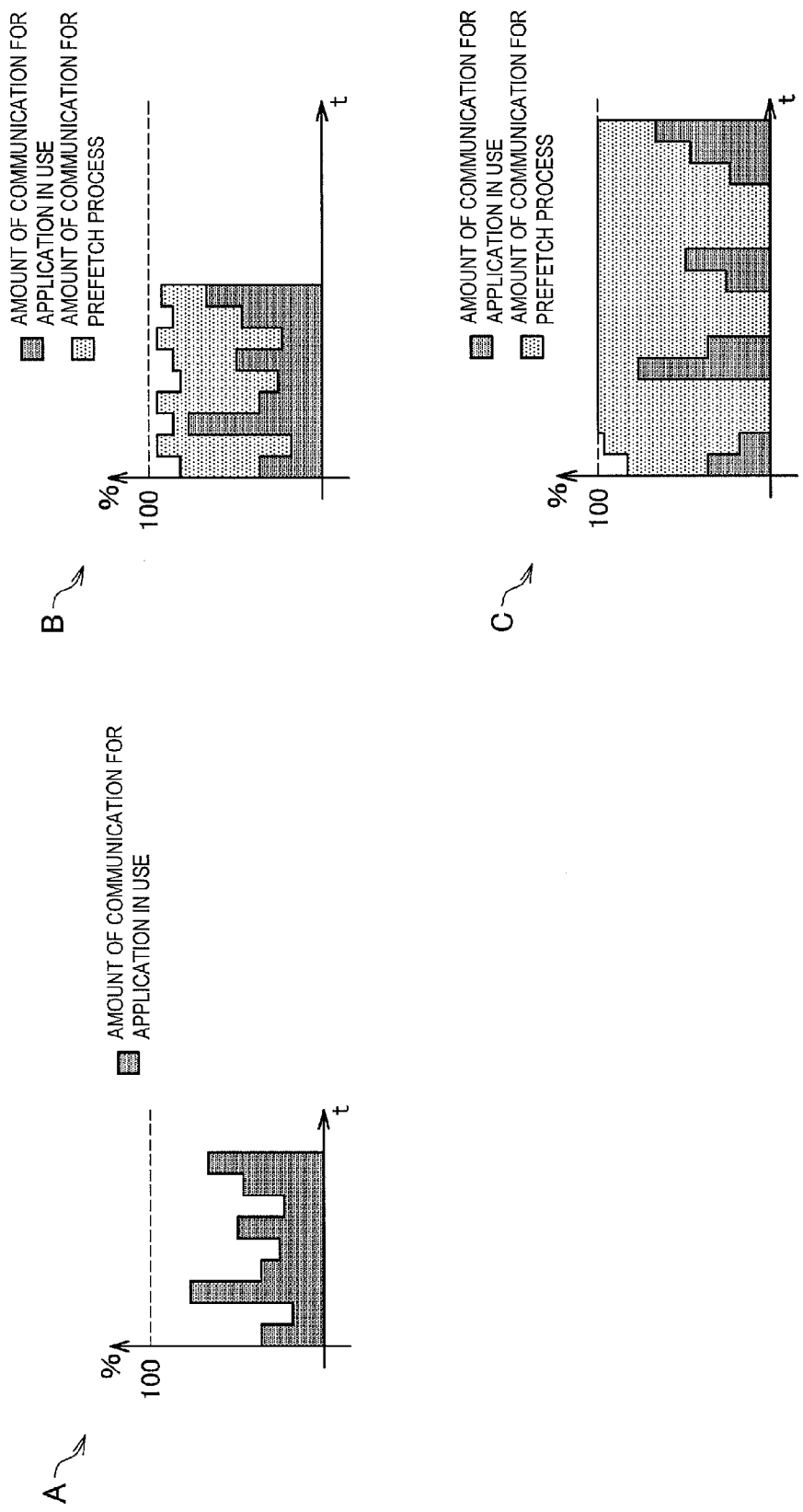
FIG. 5 is an explanatory diagram illustrated to describe an example of processing performed by the communication control method according to the present embodiment.

FIG. 5 is an explanatory diagram illustrated to describe an example of the process performed by the communication control method according to the present embodiment. The portion A of FIG. 5 illustrates an example of the bandwidth usage rate in the communication for an application in use in the case where the prefetch by the prefetch control process according to the present embodiment (hereinafter, referred sometimes to as "prefetch process") is not performed. The portion B of FIG. 5 illustrates an example of the case in which the prefetch of data is performed when the communication for an application in use is performed in a similar way to the portion A of FIG. 5. The portion C of FIG. 5 illustrates another example of the case in which the prefetch of data is performed.

For example, as shown in the portion B of FIG. 5, when the bandwidth usage rate does not reach 100% even though communication for the prefetch of a target of processing is performed, that is, when the communication for an application in use is not disturbed, an effect that can complete the communication in shorter time and an effect that allows a reduction in the power for maintaining the connection are achieved. However, as shown in the portion C of FIG. 5, when the bandwidth is occupied through communication for the prefetch of a target of processing, that is, when the communication for an application in use is disturbed, delay occurs in the communication for an application in use, which is more likely to cause a negative effect on the usability.

The communication control device according to the present embodiment prevents the occurrence of situations as shown in the portion C of FIG. 5 and allows data corresponding to a target of processing to be prefetched by using the bandwidth usage amount for each target candidate of processing that is set to the information relating to the prefetch.

Specifically, the communication control device according to the present embodiment determines whether data is prefetchable, and if it is determined that data is prefetchable, the communication control device decides a prefetch bandwidth value that is a value of the bandwidth available for the prefetch of data. The prefetch bandwidth value according to the present embodiment corresponds to a value indicating the bandwidth usage amount that is available for prefetch of data. The prefetch bandwidth value is sometimes referred to as "recommended bandwidth usage amount" hereinafter.

The communication control device according to the present embodiment decides a target candidate of processing, to which a bandwidth usage amount that does not exceed the decided prefetch bandwidth value is set, as a target of processing. The communication control device according to the present embodiment allows data corresponding to the decided target of processing to be prefetched.

Figure 6:
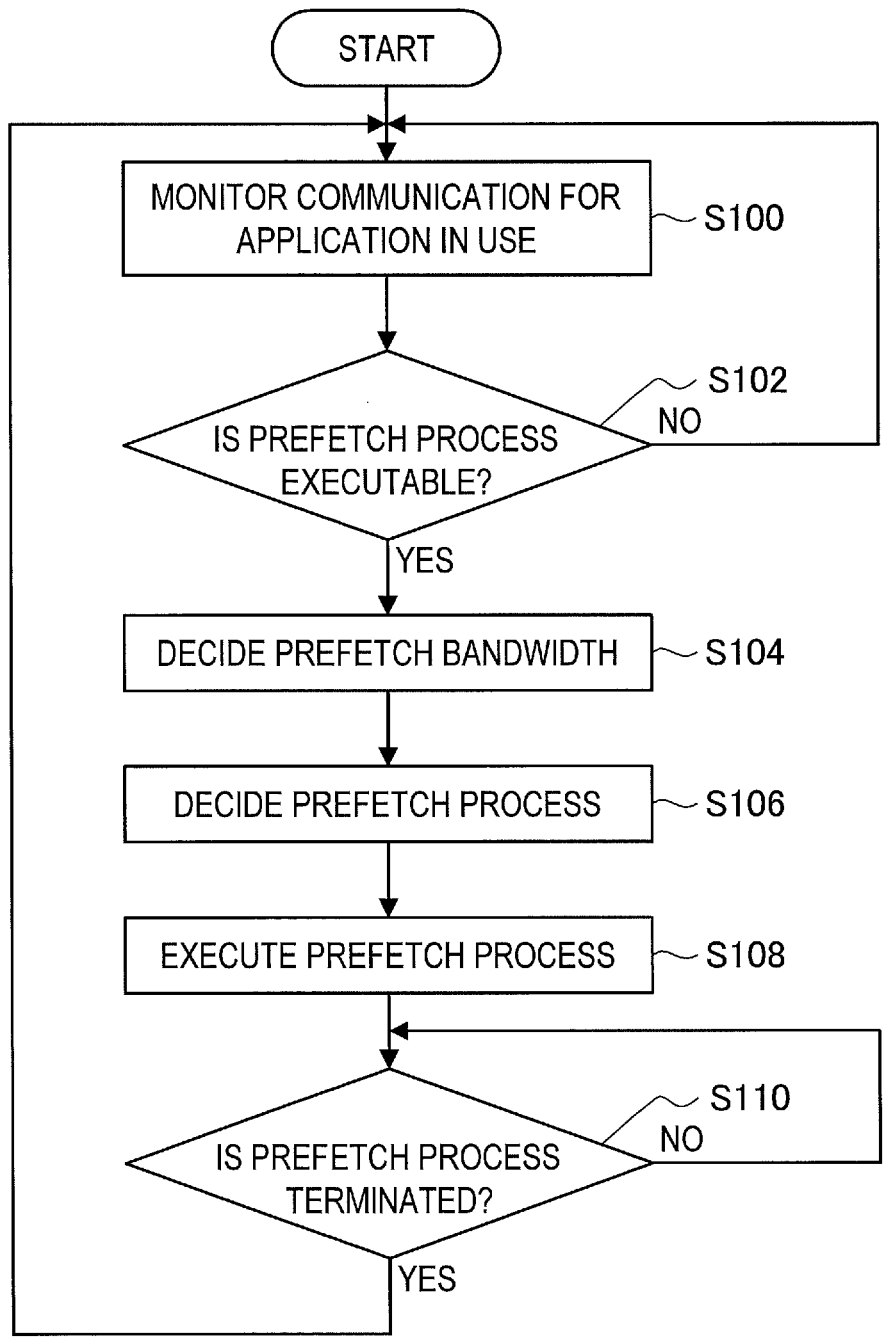
FIG. 6 is an explanatory diagram illustrated to describe an example of processing performed by the communication control method according to the present embodiment.

FIG. 6 is an explanatory diagram illustrated to describe an example of the process performed by the communication control method according to the present embodiment. FIG.

6 illustrates an example of the prefetch control process according to the first example.

The communication control device according to the present embodiment monitors the communication for the application in use (S100). In the process of step S100, for example, it is detected to be in the connection state through communication for the application in use. The process in step S100 may be performed by the communication control device according to the present embodiment or may be performed by an external device such as an external communication device connected to the communication control device according to the present embodiment. The process in step S100 may be performed in a periodic or non-periodic manner.

The communication control device according to the present embodiment determines whether the prefetch process is executable (S102). The communication control device according to the present embodiment performs one or more of determination processes shown in items (A) to (C) below, and thus determines whether the prefetch process is executable.

(A) First Example of Determination Process

The communication control device according to the present embodiment determines whether data is prefetchable based on a value relating to the communication bandwidth for an application in use.

The value relating to the bandwidth according to the present embodiment includes, for example, bandwidth usage rate and bandwidth usage amount.

If the immediately previous bandwidth usage rate of the communication for an application in use is smaller than a predetermined threshold (or the immediately previous bandwidth usage rate is less than or equal to the threshold), the communication control device according to the present embodiment determines that the data is prefetchable. The communication control device according to the present embodiment performs the determination, for example, by obtaining data indicating the immediately previous bandwidth usage amount of the communication for the application in use and calculating a bandwidth usage rate based on the bandwidth usage amount indicated by the obtained data and the maximum value of the bandwidth. The communication control device according to the present embodiment is also capable of determining whether data is prefetchable in a similar way to the case of using the band usage rate by a threshold process that uses the immediately previous band usage amount in the communication for the application in use and the predetermined threshold.

The threshold according to the present embodiment may be a fixed value that is determined in advance or may be a variable value that is changeable based on the user operation or the like. This is similarly applicable to other thresholds described later.

(B) Second Example of Determination Process

The communication control device according to the present embodiment determines whether data is prefetchable based on a history of values relating to the bandwidth of communication for an application in use.

The communication control device according to the present embodiment may acquire data indicating the band usage amount of the communication for an application in use in a periodic or non-periodic manner and may learn the communication condition of the application in use. The communication control device according to the present embodiment learns the communication condition of the application in use by using any method that can learn it using data indicating the bandwidth usage amount. If it is determined that the bandwidth usage amount (or a bandwidth usage rate based on the bandwidth usage amount) of data transmitted or received through the communication for the application in use is smaller than the predetermined threshold (or the bandwidth usage amount is less than or equal to the threshold), the communication control device according to the present embodiment determines that data is prefetchable at the timing defined by the communication for the application in use.

The communication control device according to the present embodiment performs learning, for example, based on the bandwidth usage rate of the communication for the application in use, and thus can determine whether data is prefetchable in a similar manner to that described above.

(C) Third Example of the Determination Process

When the communication for the application in use is completed, the communication control device according to the present embodiment determines that data is prefetchable.

The communication control device according to the present embodiment, for example, detects the completion of a series of communications (transaction) for the application in use and determines that data is prefetchable at the timing when the series of communications are completed. The timing when the completion of communication is detected according to the present embodiment includes examples as follows:

Timing when a library for processing http request receives all the response data to an application request Timing when a socket of an application is closed In step S102, if it is not determined that the prefetch process is executable, the communication control device according to the present embodiment returns the process to step S100 and repeats the subsequent step.

In step S102, if it is determined that the prefetch process is executable, the communication control device according to the present embodiment decides a prefetch bandwidth value (S104).

The communication control device according to the present embodiment, for example, specifies a prefetch bandwidth value corresponding to the application in use by using a table (or a database) in which information indicating the application in use (for example, an ID indicating an application) is associated with a prefetch bandwidth value. The communication control device according to the present embodiment decides the specified prefetch bandwidth value as a prefetch bandwidth value to be used.

The communication control device according to the present embodiment, for example, specifies a maximum value of the bandwidth usage amount corresponding to the application in use by using a table (or a database) in which information indicating the application in use (for example, an ID indicating an application) is associated with a maximum value of the bandwidth usage amount in the communication for the application in use. The communication control device according to the present embodiment may decide a value that is less than or equal to (or smaller than) the value obtained by subtracting the maximum value of the specified bandwidth usage amount from a maximum value of bandwidth as a prefetch bandwidth value to be used.

The process in step S104 is not limited to that described above. For example, the communication control device according to the present embodiment may decide a prefetch bandwidth value that is increased in a stepwise manner as a prefetch bandwidth value to be used.

Figure 7:
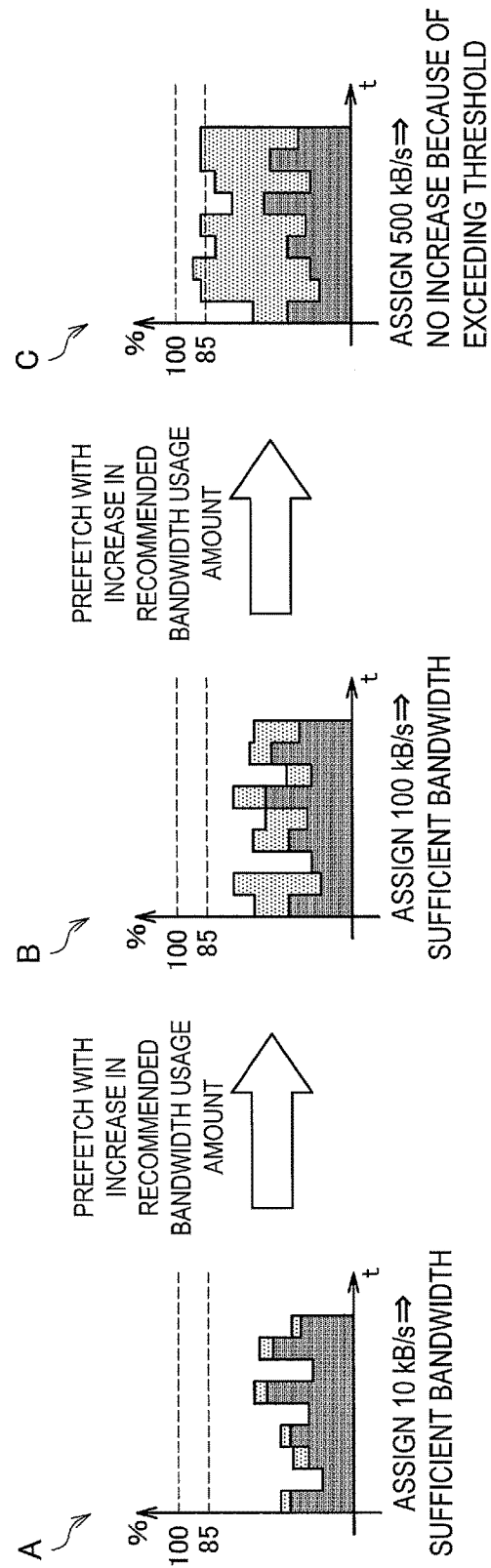
FIG. 7 is an explanatory diagram illustrated to describe an example of processing performed by the communication control method according to the present embodiment.

FIG. 7 is an explanatory diagram illustrated to describe an example of the process performed by the communication control method according to the present embodiment. FIG.

7 illustrates an example of the process related to the decision of the prefetch bandwidth value in FIG. 6 (the process in step S104).

The communication control device according to the present embodiment decides a low prefetch bandwidth value in such a way as to have no effect on the application in use, such as a few kilobytes per second (kB/s) or 10 kB/s. The communication control device according to the present embodiment determines whether a value relating to a bandwidth in the case of performing the prefetch of data using the decided prefetch bandwidth value is less than or equal to (or smaller than) the predetermined threshold. The following takes the case in which the value relating to a bandwidth according to the present embodiment is a bandwidth usage rate as an example.

The portion A of FIG. 7 illustrates an example in which the communication control device according to the present embodiment decides a rate of 10 kB/s as a prefetch bandwidth value to be used. FIG. 7 illustrates an example in which the threshold of a bandwidth usage rate is 85%. For example, as shown in the portion A of FIG. 7, if the bandwidth usage rate is less than or equal to the predetermined threshold (or if the bandwidth usage rate is smaller than the threshold) as a result of performing prefetch of data using the decided prefetch bandwidth value, the communication control device according to the present embodiment decides a prefetch bandwidth value that is greater than the prefetch bandwidth value that is previously decided. The communication control device according to the present embodiment determines whether the bandwidth usage rate in the case where prefetch of data is performed using the decided prefetch bandwidth value is less than or equal to the predetermined threshold (or if the bandwidth usage rate is smaller than the threshold).

The portion B of FIG. 7 illustrates an example in which the communication control device according to the present embodiment decides a rate of 100 kB/s as a prefetch bandwidth value. For example, as shown in the portion B of FIG. 7, if the bandwidth usage rate is less than or equal to the predetermined threshold (or if the bandwidth usage rate is smaller than the threshold) as a result of performing the prefetch of data using the decided prefetch bandwidth value, the communication control device according to the present embodiment decides a prefetch bandwidth value that is greater than the prefetch bandwidth value that is previously decided. The communication control device according to the present embodiment determines whether the bandwidth usage rate in the case where prefetch of data is performed using the decided prefetch bandwidth value is less than or equal to the predetermined threshold (or if the bandwidth usage rate is smaller than the threshold).

The portion C of FIG. 7 illustrates an example in which the communication control device according to the present embodiment decides a rate of 500 kB/s as a prefetch bandwidth value. For example, as shown in the portion C of FIG. 7, if the bandwidth usage rate is greater than the predetermined threshold (or if the bandwidth usage rate is more than or equal to the threshold) as a result of performing prefetch of data using the decided prefetch bandwidth value, the communication control device according to the present embodiment does not decide a larger prefetch bandwidth value.

For example, as shown in FIG. 7, in the case where the communication control device according to the present embodiment decides a prefetch bandwidth value having a larger value in a stepwise manner, if the value relating to the bandwidth is greater than the predetermined threshold (or if the value relating to the bandwidth is more than or equal to the threshold), the communication control device does not decide a larger prefetch bandwidth value. With this process, the communication control device according to the present embodiment can prevent the communication for the application in use from being disturbed and can enhance the bandwidth usage rate of communication in a stepwise manner.

Referring again to FIG. 6, an example of the prefetch control process according to the first example is described. If the prefetch bandwidth value is decided in step S104, the communication control device according to the present embodiment decides a target of processing as a target for the prefetch process (S106).

The communication control device according to the present embodiment decides a target candidate of processing, to which the bandwidth usage amount that does not exceed the decided prefetch bandwidth value is set, as a target of processing, for example, by using information relating to prefetch as shown in FIG. 4.

The communication control device according to the present embodiment decides one target candidate of processing, to which the bandwidth usage amount that does not exceed the decided prefetch bandwidth value is set, from among target candidates of processing as a target of processing.

If one target candidate of processing is decided as a target of processing, the communication control device according to the present embodiment decides, for example, a target candidate of processing, to which the largest bandwidth usage amount is set, as a target of processing. The process of deciding one target candidate of processing as a target of processing is not limited to the example described above. For example, the communication control device according to the present embodiment may decide a target candidate of processing that is selected in a random manner from among the target candidates of processing, to which the bandwidth usage amount that does not exceed the decided prefetch bandwidth value is set, as a target of processing.

The communication control device according to the present embodiment may decide a plurality of target candidates of processing, to which the bandwidth usage amount that does not exceed the decided prefetch bandwidth value is set, from among the target candidates of processing as a target of processing.

When a plurality of target candidates of processing are decided as a target of processing, the communication control device according to the present embodiment specifies, for example, a combination of target candidates of processing in which a value obtained by adding the bandwidth usage amount set to each target candidate of processing is less than or equal to the decided prefetch bandwidth value (or a combination in which the value obtained by addition is smaller than the decided prefetch bandwidth value). The communication control device according to the present embodiment decides a target candidate of processing corresponding to a combination having the largest value obtained by addition from among the specified combinations of target candidates of processing as a target of processing. The process of deciding a plurality of target candidates of processing as a target of processing is not limited to the example described above. For example, the communication control device according to the present embodiment may decide a target candidate of processing corresponding to a combination selected in a random manner from among the specified combination of target candidates of processing as a target of processing.

Taking the information relating to prefetch shown in FIG. 4 as an example, when the prefetch bandwidth value is 1 MB/s, the communication control device according to the present embodiment decides, for example, "funcA of application A and funcB of application B" or "funcA of application A, funcB of application B, and funcC of application C", as a target of processing.

When a plurality of target candidates of processing are decided as a target of processing, the prefetch process on the decided target of processing is performed in parallel, and thus it is possible to use the bandwidth in a more effective way.

When there are a plurality of target candidates of processing to which the bandwidth usage amount that does not exceed the decided prefetch bandwidth value is set, the communication control device according to the present embodiment decides a target of processing as described below using other indexes set to the information relating to prefetch (for example, degree of effectiveness shown in the portion C of FIG. 4, degree of priority shown in the portion D of FIG. 4, and re-execution request value shown in the portion E of FIG. 4).

Target candidate of processing having a higher degree of effectiveness is decided as a target of processing Target candidate of processing having a higher degree of priority is decided as a target of processing Target candidate of processing having a re-execution request value that is a value for requesting re-execution is decided as a target of processing The communication control device according to the present embodiment is also capable of deciding a target of processing using a combination of a plurality of other indexes set to the information relating to prefetch.

As a detailed example, the communication control device according to the present embodiment may specify a target candidate of processing having a higher degree of priority from among the target candidates of processing to which the bandwidth usage amount that does not exceed the decided prefetch bandwidth value is set. When there are a plurality of the specified target candidates of processing, the communication control device according to the present embodiment decides a target candidate of processing in which the re-execution request value is a value for requesting re-execution as a target of processing.

The communication control device according to the present embodiment may specify a target candidate of processing in which the re-execution request value is a value for requesting re-execution from among the target candidates of processing to which the bandwidth usage amount that does not exceed the decided prefetch bandwidth value is set. When there are a plurality of the specified target candidates of processing, the communication control device according to the present embodiment decides a target candidate of processing having a higher degree of priority as a target of processing.

Although the example of a combination of the degree of priority and the re-execution request value has been described in the above, the process in which a degree of priority is combined can be performed.

If a target of processing is decided as a target for the prefetch process in step S106, the communication control device according to the present embodiment performs the prefetch process and allows data corresponding to the decided target of processing to be prefetched (S108).

The communication control device according to the present embodiment determines whether the prefetch process on the target of processing is completed (S110). The communication control device according to the present embodiment may determine whether the prefetch process on the target of processing is completed based on data that indicates the completion of the prefetch process, which is notified from the application of the target of processing.

If it is not determined that the prefetch process on the target of processing is completed in step S110, the communication control device according to the present embodiment prevents the process from being proceeded until it is determined that the prefetch process on the target of processing is completed. If it is determined that the prefetch process on the target of processing is completed in step S110, the communication control device according to the present embodiment returns the process to step S100 and repeats the subsequent steps.

When the bandwidth usage amount for each target candidate of processing is set to the information relating to prefetch, the communication control device according to the present embodiment decides a target of processing to which the bandwidth usage amount that does not exceed the prefetch bandwidth value is set and allows data corresponding to the decided target of processing to be prefetched, for example, by performing the process shown in FIG. 6. The prefetch control process according to the first example is not limited to the example shown in FIG. 6.

(ii) Second Example of Prefetch Control Process: Process Performed in a Case where the Degree of Effectiveness for Each Target Candidate of Processing is Set to the Information Relating to Prefetch When the degree of effectiveness for each target candidate of processing is set to the information relating to prefetch, the communication control device according to the present embodiment decides a target candidate of processing having higher effectiveness of prefetch indicated by the degree of effectiveness.

The target candidate of processing having higher effectiveness of prefetch is decided as a target of processing, and thus a target candidate of processing having an effect that can reduce the power consumed by the prefetch (effectiveness of prefetch) is decided as a target of processing. Thus, the target candidate of processing having higher effectiveness of prefetch is decided as a target of processing, and thus it is possible to reduce the power consumed to maintain the connection state.

When there are a plurality of target candidates of processing having higher effectiveness of prefetch, the communication control device according to the present embodiment can decide a target of processing using one or more other indexes set to the information relating to prefetch, for example, in a similar way to the prefetch control process according to the first example shown in the above item (i).

(iii) Third Example of Prefetch Control Process: Process Performed in a Case where the Degree of Priority for Each Target Candidate of Processing is Set to the Information Relating to Prefetch When a degree of priority for each target candidate of processing is set to the information relating to prefetch, the communication control device according to the present embodiment decides a target candidate of processing having higher priority order of the prefetch indicated by the degree of priority as a target of processing.

The target candidate of processing having higher priority order of prefetch is decided as a target of processing, and thus a target candidate of processing having a higher order of priority for performing the prefetch is decided as a target of processing.

When there are a plurality of target candidates of processing having higher priority order of prefetch, the communication control device according to the present embodiment can decide a target of processing using one or more other indexes set to the information relating to prefetch, for example, in a similar way to the prefetch control process according to the first example shown in the above item (i).

(iv) Fourth Example of Prefetch Control Process: Process Performed in a Case in which a Re-Execution Request Value for Each Target Candidate of Processing is Set to the Information Relating to Prefetch When a re-execution request value for each target candidate of processing is set to the information relating to prefetch, the communication control device according to the present embodiment prevents a target candidate of processing, to which a re-execution request value indicating no prefetch is to be performed repeatedly is set from among the target candidates of processing in which prefetch of data has been performed, from being decided as a target of processing.

The case in which the re-execution request value does not indicate that the prefetch is repeatedly performed may mean that a target candidate of processing is not necessary to prefetch data again. In other words, if a target candidate of processing, to which a re-execution request value indicating no prefetch is to be performed repeatedly is set, is decided as a target of processing, since the prefetch of data is useless to be performed, significant prefetch of data is not expected to be performed. Thus, the communication control device according to the present embodiment does not decide a target candidate of processing, to which a re-execution request value indicating no prefetch is to be performed repeatedly is set as a target of processing, but decides a target candidate of processing in which a re-execution request value is a value requesting a re-execution as a target of processing.

When there are a plurality of target candidates of processing in which a re-execution request value is a value requesting a re-execution, the communication control device according to the present embodiment can decide a target of processing using one or more other indexes set to the information relating to prefetch, for example, in a similar way to the prefetch control process according to the first example shown in the above item (i).

(v) Other Examples of Prefetch Control Process

As described above, the communication control device according to the present embodiment can decide a target of processing using a plurality of indexes set to the information relating to prefetch. Thus, the communication control device according to the present embodiment may perform a combined process of the prefetch control process according to the first example shown in the above item (i) to the prefetch control process according to the fourth example shown in the above item (iv).

The communication control device according to the present embodiment may perform the process described above as a prefetch control process.

The prefetch control process according to the present embodiment is not limited to the process described above.

For example, the communication control device according to the present embodiment can stop the prefetch of data based on a value relating to the bandwidth for communication.

By the prefetch control process, even when the prefetch having no effect on the application in use is performed, it is not necessarily for a bandwidth to be exhausted for the reasons as follow:

Communication for the application in use is performed using an expected bandwidth usage amount Communication for a target of processing of the prefetch process is performed exceeding the bandwidth usage amount (estimated bandwidth usage amount) set to the information relating to prefetch Communication for an application in use and an application other than a target of processing for the prefetch process is performed If the bandwidth is exhausted for some reasons as described above, delay occurs in the communication for an application in use, which may cause a negative effect on the usability. Thus, if the bandwidth is exhausted for some reasons as described above, the communication control device according to the present embodiment stops the prefetch process to reduce an effect on the usability.

When a value relating to the bandwidth such as bandwidth usage amount or bandwidth usage rate is greater than the predetermined threshold (or when the value relating to the bandwidth is more than or equal to the threshold), the communication control device according to the present embodiment stops the prefetch of data on a target of processing.

The communication control device according to the present embodiment stops the prefetch of data on a target of processing by transmitting an instruction to stop the communication to an application to be processed or an application corresponding to processing of the application to be processed. The application for a target of processing that receives the stop instruction stops the data communication with an external device by not performing various requests such as data transmission request to the external device such as a server or by disconnecting the connection with the external device.

The communication control device according to the present embodiment performs the process of the above item (1) (prefetch control process) as a process to be performed by the communication control method according to the present embodiment.

The process of the above item (1) (prefetch control process) may implement the prefetch of data as shown in the portion B of FIG. 3. Thus, the communication control device according to the present embodiment performs the process of the above item (1) (prefetch control process) as a process to be performed by the communication control method according to the present embodiment, and thus it is possible to reduce the power consumed to maintain the connection state in which the communication control device is connected to an external device.

The process to be performed by the communication control method according to the present embodiment is not limited to the process of the above item (1). For example, the communication control device according to the present embodiment can further perform one or both of a state determination process of item (2) and a management process of item (3) described below, as a process to be performed by the communication control method according to the present embodiment.

(2) State Determination Process

As a method for obtaining an effect of reducing the power consumed to maintain the connection state (higher power than the power consumed in an idle state), it can be considered that the process of the above item (1) (prefetch control process) is performed in the connection state. However, if the connection state is in the condition that the process of the above item (1) (prefetch control process) is performed, the connection state is extended by the communication related to the prefetch of a target of processing that is performed by the process of the above item (1) (prefetch control process), and thus the process of the above item (1) (prefetch control process) is continued and a transition to the idle state is likely to be disabled.

The communication control device according to the present embodiment determines whether it is in the state where prefetch is performed based on the state of communication in the application being executed, as a state determination process.

Specifically, when the communication for the application in use is performed, it is determined that the communication control device according to the present embodiment is in the state of performing prefetch. When the communication for the application in use is not performed but an application other than the application in use is performed (sometimes referred to as "other applications" hereinafter), it is not determined that the communication control device according to the present embodiment is in the state of performing a new prefetch process.

In the case where the state determination process is performed, when it is determined that the communication control device according to the present embodiment is in the state of performing prefetch, the communication control device allows data to be prefetched selectively based on the information relating to prefetch of data by the process of the above item (1) (prefetch control process).

Figures 8, 9:
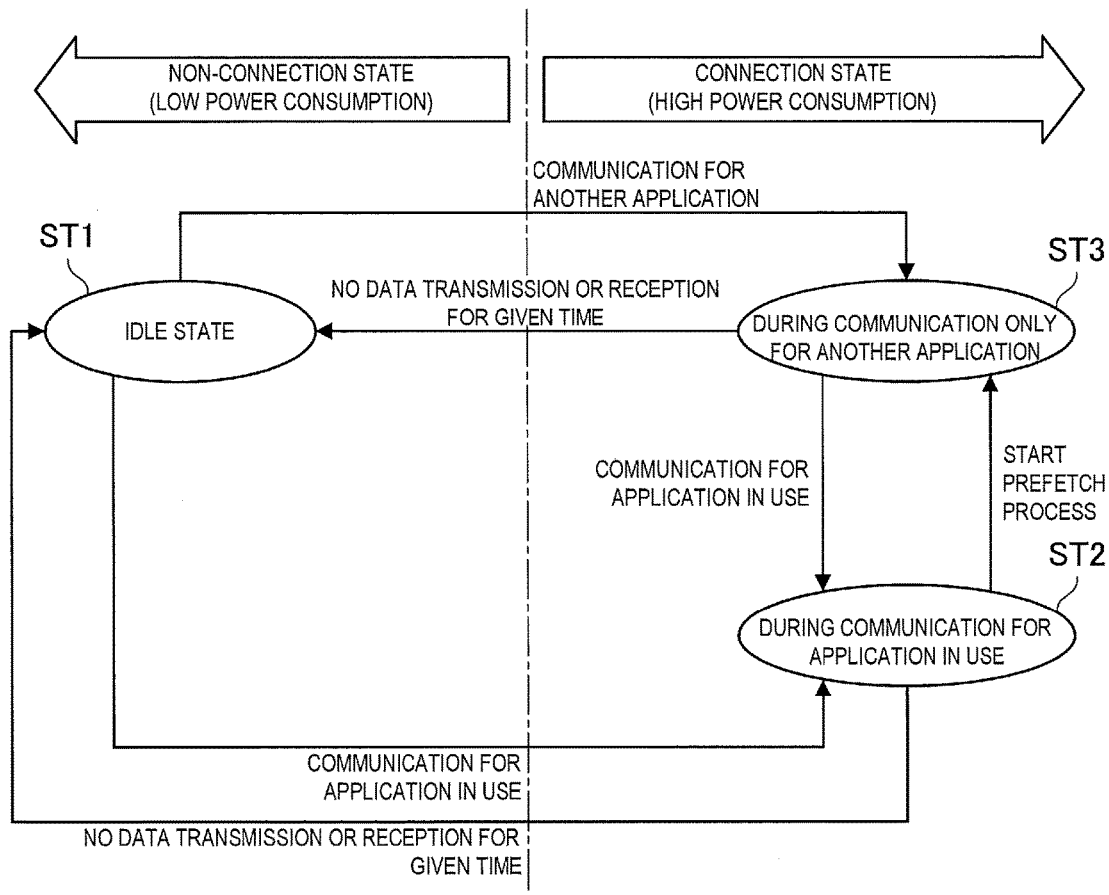
FIG. 8 is an explanatory diagram illustrated to describe an example of processing performed by the communication control method according to the present embodiment.
FIG. 9 is an explanatory diagram illustrated to describe an example of processing performed by the communication control method according to the present embodiment.

FIG. 8 is an explanatory diagram illustrated to describe an example of the process performed by the communication control method according to the present embodiment. FIG. 8 illustrates an example of a state transition in the case where the state determination process according to the present embodiment and the prefetch control process according to the present embodiment are performed as a process to be performed by the communication control method according to the present embodiment.

As shown in FIG. 8, the state in the case where the state determination process according to the present embodiment and the prefetch control process according to the present embodiment may include an idle state ST1, a state ST2 in which communication for an application in use is performed, and a state ST3 in which communication for other applications is performed.

The communication control device according to the present embodiment determines to be a state that can perform prefetch when it is in the state ST2, and allows a target of processing to prefetch data by the process of the above item (1) (prefetch control process). By performing the prefetch of data, a transition from the state ST2 to the state ST3 is performed. In the state ST3, when the communication for an application in use is performed, the communication control device according to the present embodiment performs a transition from the state ST3 to the state ST2.

When it is in the state ST2 in the case where the process of prefetching data is completed, the communication control device according to the present embodiment is determined to be in the state of performing prefetch again, and then allows a target of processing to prefetch data by performing the process of the above item (1) (prefetch control process).

When it is in the state ST3 in the case where the process of prefetching data is completed, the communication control device according to the present embodiment is determined to be not in the state of performing prefetch, and then remains its state. When a predetermined period of time has elapsed while remaining its state, the communication control device according to the present embodiment performs a transition from the state ST3 to the state ST1. When the communication for an application in use is performed before a predetermined period of time has elapsed while remaining its state, the communication control device according to the present embodiment performs a transition from the state ST3 to the state ST2, and is determined to be in the state of performing the prefetch again and allows a target of processing to prefetch data by performing the process of the above item (1) (prefetch control process).

For example, as shown in FIG. 8, the communication control device according to the present embodiment determines whether it is in the state of performing the prefetch and selectively allows a target of processing to prefetch data. Thus, it is possible to reduce the power consumed to maintain the connection state while reducing the possibility that a transition to an idle state having lower power consumption (non-connection state) is not performed.

(3) Management Process

The communication control device according to the present embodiment also can perform a process for managing information relating to prefetch as shown in FIG. 4 as an example of the process performed by the communication control method according to the present embodiment.

The information relating to prefetch may be managed by setting a target candidate of processing (new registration), updating various information, and so on.

The communication control device according to the present embodiment sets a target candidate of processing when an application is installed, as shown with reference to FIG. 4. The communication control device according to the present embodiment may set a target candidate of processing based on the user operation for setting information relating to prefetch of data.

The communication control device according to the present embodiment updates a bandwidth usage amount, a degree of effectiveness, a degree of priority, a re-execution request value, as shown with reference to FIG. 4.

An example of the management process according to the present embodiment will be described by taking the degree of effectiveness (for example, the degree of effectiveness shown in the portion C of FIG. 4) that is an index indicating the effect of reducing the power by the prefetch (effectiveness of prefetch) as an example.

The data obtained by performing prefetch using the process of the above item (1) (prefetch control process) is speculative, and thus the obtained data is not limited to the use in a target of processing. Thus, if unnecessary data is prefetched, a wasteful communication occurs, resulting in useless power consumption. Thus, by prefetching data that is likely to be used by a target of processing, it is possible to reduce the useless power consumption as described above.

There are data that can effectively reduce the power by prefetch at the timing of accessing data by an application and data that is difficult to reduce the power by prefetch as expected. In other words, by allowing a target of processing to preferentially prefetch data that can reduce the power in a more effective way, it is possible to increase the effect of reducing the power consumption.

For example, as shown in FIG. 4, when the degree of effectiveness is set to information relating to prefetch for each target candidate of processing, the communication control device according to the present embodiment updates the degree of effectiveness set to the information relating to prefetch. The communication control device according to the present embodiment updates the degree of effectiveness set to the information relating to prefetch of data by performing the processes of items (3-1) to (3-3) described below in such a way that the degree of effectiveness of a target of processing having a higher power reduction effect becomes larger.

(3-1) First Example of Management Process Related to Update of Degree of Effectiveness The communication control device according to the present embodiment updates the degree of effectiveness set to the information relating to prefetch based on the use history of the prefetched data.

As described above, it is possible to reduce wasteful power consumption by preventing wasteful data such as unnecessary data from being prefetched. Thus, the communication control device according to the present embodiment updates the degree of effectiveness to a higher value based on a data access to data obtained by the prefetch (sometimes referred to as "prefetched data" hereinafter) to allow a target of processing prefetching data that is more likely to be used to perform the prefetch.

The communication control device according to the present embodiment monitors the occurrence of a data access to the prefetched data from the target of processing. When a data access to the prefetched data occurs, the communication control device according to the present embodiment performs a process related to the update of the degree of effectiveness. The data access to the prefetched data corresponds to the use history of the prefetched data.

FIG. 9 is an explanatory diagram illustrated to describe an example of the process to be performed by the communication control method according to the present embodiment. FIG. 9 illustrates an example of the prefetched data that is related to the monitoring of the data access of the prefetched data.

The prefetched data may be provided as an access as shown in FIG. 9. The communication control device according to the present embodiment monitors a data access to the prefetched data by monitoring the read out by a data acquisition process shown in FIG. 9. The method for monitoring a data access to the prefetched data according to the present embodiment is not limited to the example described above.

Figure 10:
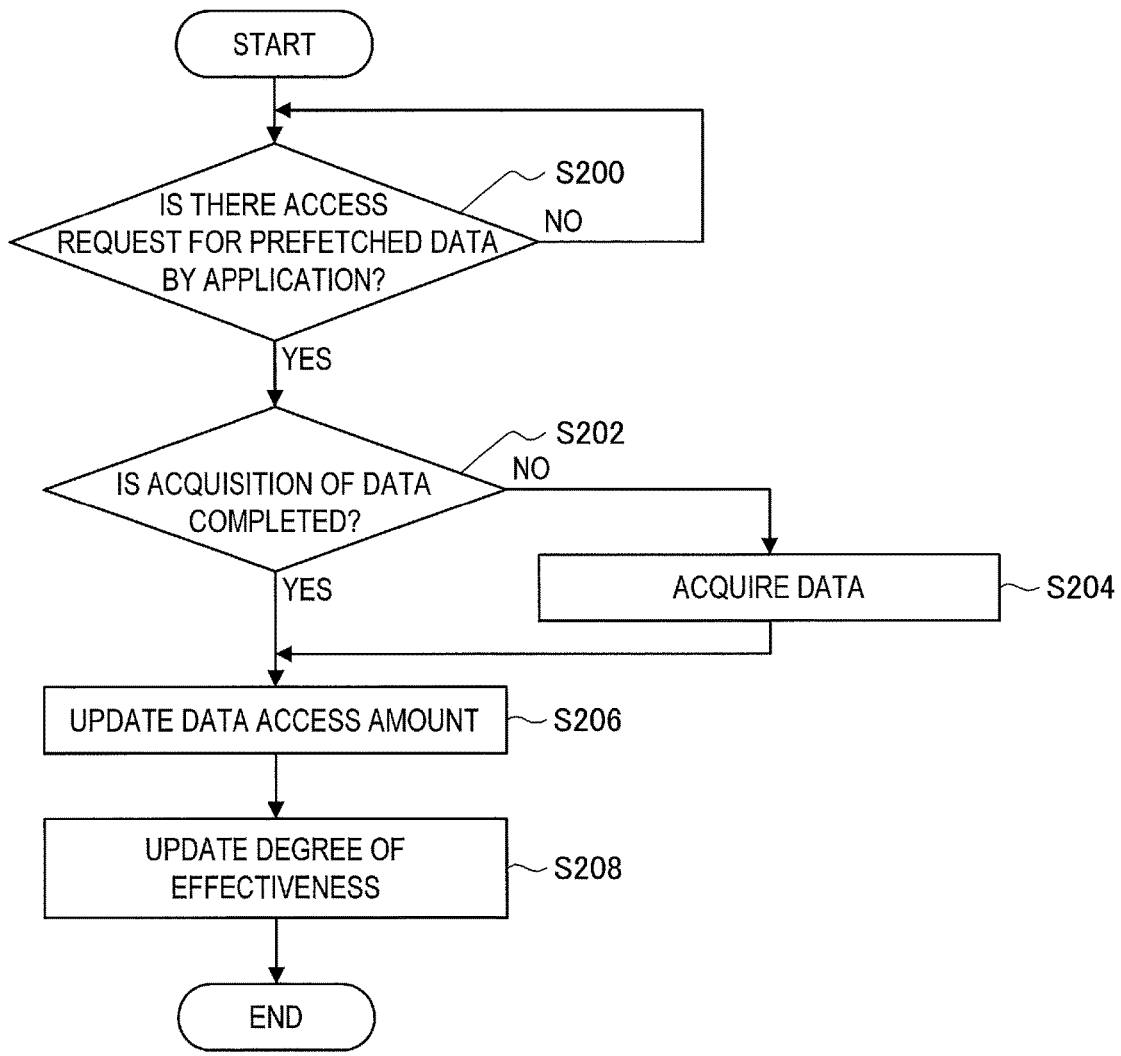
FIG. 10 is an explanatory diagram illustrated to describe an example of processing performed by the communication control method according to the present embodiment.

FIG. 10 is an explanatory diagram illustrated to describe an example of the process to be performed by the communication control method according to the present embodiment. FIG. 10 illustrates an example of a first example of the management process related to the update of the degree of effectiveness.

The communication control device according to the present embodiment determines whether an access request to the prefetched data is performed by an application (S200). If it is determined that the read out of the data acquisition process shown in FIG. 9 is performed, the communication control device according to the present embodiment determines that the access request is performed.

If it is not determined that the access request is performed in step S200, the communication control device according to the present embodiment prevents the process from being performed until the access request is determined to be performed.

If it is determined that the access request is performed in step S200, the communication control device according to the present embodiment determines whether data corresponding to the access request is acquired by the prefetch (S202). When the data corresponding to the access request is acquired by the prefetch is stored in a recording medium stored with the prefetched data, such as a storage unit (described later) and an external recording medium connected to the communication control device, the communication control device according to the present embodiment determines that data corresponding to the access request is acquired by the prefetch.

If it is determined that data is acquired in step S202, the communication control device according to the present embodiment performs a process of step S206, which will be described later.

If it is not determined that data is acquired in step S202, the communication control device according to the present embodiment acquires data corresponding to the access request by the process of the above item (1) (prefetch control process) (S204). The communication control device according to the present embodiment may acquire data corresponding to the access request by the process of the above item (1) (prefetch control process) and the process of the above item (2) (state determination process).

If the data is acquired in step S204, the communication control device according to the present embodiment updates "received data amount" of the prefetched data shown in FIG. 9.

If it is determined that the data is acquired in step S202 of if the data corresponding to the access request is acquired in step S204, the communication control device according to the present embodiment updates a data access amount (S206). The communication control device according to the present embodiment updates the data access amount by adding the data amount for the access request to "accessed data amount" of the prefetched data shown in FIG. 9.

The communication control device according to the present embodiment updates the degree of effectiveness (S208). The communication control device according to the present embodiment performs a calculation of dividing "accessed data amount" by "received data amount" and updates the degree of effectiveness based on the calculation result. The communication control device according to the present embodiment updates the degree of effectiveness by setting a value calculated by dividing "accessed data amount" by "received data amount" as a value of degree of effectiveness. The communication control device according to the present embodiment may update the degree of effectiveness by specifying a value of the degree of effectiveness corresponding to a value calculated by dividing "accessed data amount" by "received data amount" using a table in which the value calculated by dividing "accessed data amount" by "received data amount" is associated with the value of degree of effectiveness.

The communication control device according to the present embodiment updates the degree of effectiveness set to the information relating to prefetch based on the use history of the prefetched data, for example by the process shown in FIG. 10. The example of the process for updating the degree of effectiveness based on the use history of the prefetched data is not limited to the example shown in FIG. 10.

(3-2) Second Example of Management Process Related to Update of Degree of Effectiveness The communication control device according to the present embodiment updates the degree of effectiveness set to the information relating to prefetch into a weighted degree of effectiveness based on the communication frequency related to an access to data of a target candidate of processing.

As described above, it is possible to further enhance the effect of reducing the power consumption by allowing a target of processing that preferentially prefetches data capable of reducing the power in a more effective way to perform the prefetch process. Thus, the communication control device according to the present embodiment performs a weighting of degree of effectiveness in such a way that the degree of effectiveness of a target candidate of processing using "data capable of effectively reducing power by prefetch" is increased.

Figure 11:
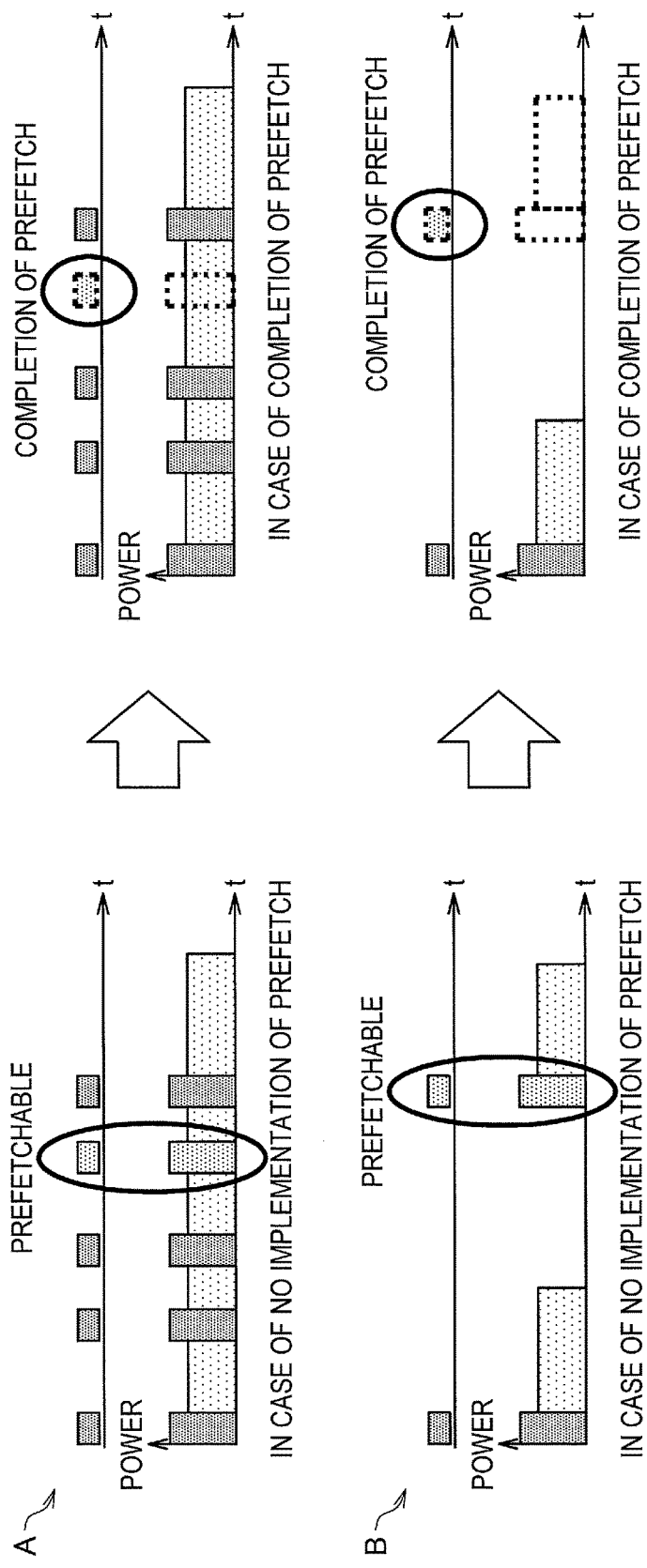
FIG. 11 is an explanatory diagram illustrated to describe an example of processing performed by the communication control method according to the present embodiment.

FIG. 11 is an explanatory diagram illustrated to describe an example of the process to be performed by the communication control method according to the present embodiment. FIG. 11 illustrates an example of a difference in the effect of the power consumption reduction through the prefetched data.

As shown in the portion A of FIG. 11, when a communication for another purpose typically occurs simultaneously in accessing a certain piece of data, the effect of the power consumption reduction is small even when the prefetch is performed on the data. On the other hand, as shown in the portion B of FIG. 11, when a communication for another purpose does not occur in accessing the prefetched data, it is possible to effectively reduce the power by the process of the above item (1) (prefetch control process).

For example, in a game application, when a result of the game is transmitted to an external device such as a server and the details of related information (data) relating to the result is displayed on a display screen, the communication for transmitting the result of the game is performed even when the related information is prefetched, thus the effect of the power consumption reduction is small. On the other hand, in a news application, the communication for other purpose is not performed even when data indicating an article is prefetched, thus it is possible to reduce the power in a more effective way. Thus, the effect of the power consumption reduction by the prefetch of data can vary with an application or the process of the application that is a target candidate of processing.

The communication control device according to the present embodiment stores the number of times that "application that is a target candidate of processing" or "application corresponding to the process on the application that is a target candidate of processing" accesses data in the connection state and the number of times that it accesses data in the disconnection state in which communication is not performed. The number of times of accessing data in the connection state and the disconnection state corresponds to data related to the communication frequency relating to an access to data of the target candidate of processing.

The communication control device according to the present embodiment compares the number of times of accessing data in the connection state with the number of times of accessing data in the disconnection state, and allows a higher degree of effectiveness to be set to a target candidate of processing having a higher frequency of number of times of accessing data in the disconnection state. The communication control device according to the present embodiment updates the degree of effectiveness by weighting a larger value to a target candidate of processing having a higher frequency of number of times of accessing data in the disconnection state, when updating the degree of effectiveness.

The communication control device according to the present embodiment specifies a value related to weighting corresponding to the frequency of the number of times of accessing data in the disconnection state using a table or the like in which the frequency of the number of times of accessing data in the disconnection state is associated with the value related to weighting (for example, a weighting factor and a sum of weighted values). The communication control device according to the present embodiment updates the degree of effectiveness set to the information relating to prefetch of data by a value of a degree of effectiveness weighted using a specified value related to weighting. As an example, for a target candidate of processing in which the frequency of the number of times of accessing data in the disconnection state occupies a ratio of 50% or more, the degree of effectiveness is 1.5 times when updating the degree of effectiveness.

(3-3) Third Example of Management Process Related to Update of Degree of Effectiveness The example of the management process related to the update of degree of effectiveness is not limited to the process related to the first example shown the above item (3-1) and the process related to the second example shown the above item (3-2).

For example, the communication control device according to the present embodiment may perform a process in which the process related to the first example shown the above item (3-1) is combined with the process related to the second example shown the above item (3-2).

The communication control device according to the present embodiment can update the degree of effectiveness in such a way as shown in items (a) and (b) which will be described below.

(a) The communication control device according to the present embodiment selects an application that is likely to be used by the user and sets a higher value of degree of effectiveness to application that is likely to be used. The communication control device according to the present embodiment sets a higher value of degree of effectiveness to application that is likely to be used by performing a weighting of the degree of effectiveness by learning the usage trends of the user using an application or by performing a weighting of the degree of effectiveness based on the history of usage orders of an application.

(b) The communication control device according to the present embodiment updates the degree of effectiveness based on a request for the update of a degree of effectiveness, which is transmitted from the application that actively determines the degree of effectiveness.

An application determines the degree of effectiveness in an active way, for example, by predicting a timing of updating data. An example of predicting the data update timing includes, for example, a prediction based on an update notification, a prediction based on information relating to the periodic acquisition of data such as news delivered every day at 12 o'clock, and the like.

The application may determine the degree of effectiveness at the time of performing the next prefetch from the result of the previous prefetch. The application may determine the degree of effectiveness by the number of data intended to be prefetched for other purposes at the time of performing the previous prefetch. The application may determine that the degree of effectiveness is low when other processes are less likely to be performed by performing the prefetch.

The communication control device according to the present embodiment performs (I) "process of the above item (1) (prefetch control process)", (II) "process of the above item (1) (prefetch control process) and process of the above item (2) (state determination process), (III) "process of the above item (1) (prefetch control process) and process of the above item (3) (management process), and (IV) "processes of the above items (1) (prefetch control process) to (3) (management process)", as a process to be performed by the communication control method according to the present embodiment.

Even when the communication control device according to the present embodiment performs any of the processes of the above items (I) to (IV) as a process to be performed by the communication control method according to the present embodiment, the communication control device according to the present embodiment can allow data to be prefetched by the process of the above item (1) (prefetch control process). Thus, even when any of the processes of the above items (I) to (IV) is performed, the communication control device according to the present embodiment can reduce the power consumed to maintain the connection state of being connected to an external device.

The process of the above item (1) (prefetch control process), the process of the above item (2) (state determination process), and the process of the above item (3) (management process) are divided, for the sake of convenience, from the process performed by the communication control method according to the present embodiment. Thus, the process performed by the communication control method according to the present embodiment may be one process regarded as each of the processes of the above items (I) to (IV), or may be one or more processes (using any dividing method) regarded as each of the processes of the above items (I) to (IV).

(Communication Control Device according to Present Embodiment)

An example of the configuration of the communication control device according to the present embodiment, which can perform the process to be performed by the communication control method according to the present embodiment described above, will be described below. The following description will be described the configuration of the communication control device according to the present embodiment by assuming that the process to be performed by the communication control method according to the present embodiment is divided into the process of the above item (1) (prefetch control process), the process of the above item (2) (state determination process), and the process of the above item (3) (management process).

Figure 12:
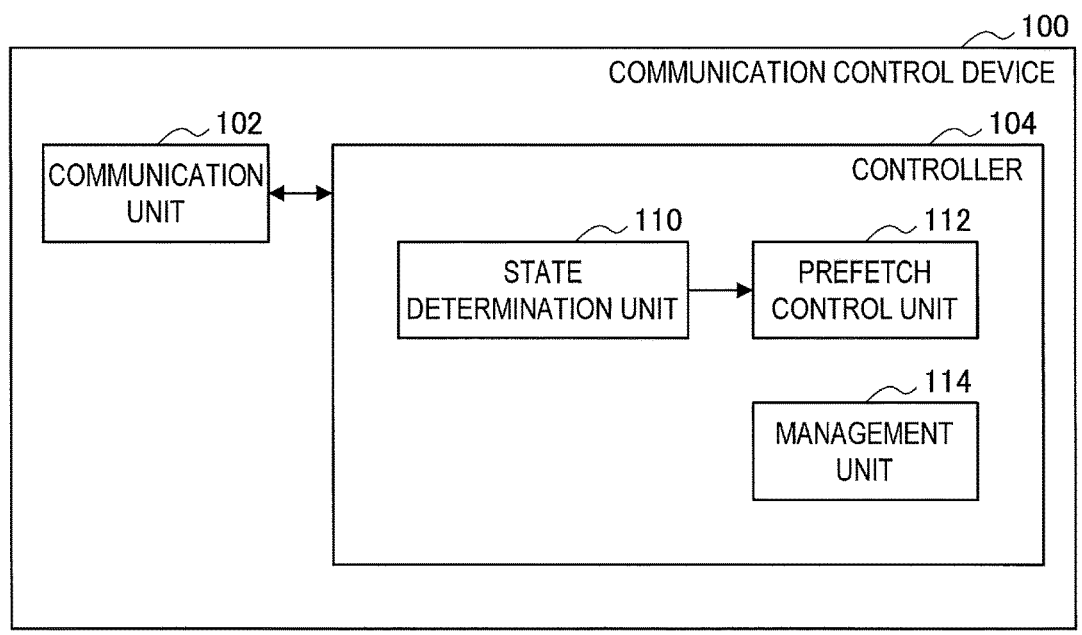
FIG. 12 is a block diagram illustrating an example of the configuration of a communication control device according to the present embodiment.

FIG. 12 is a block diagram illustrating an example of the configuration of the communication control device 100 according to the present embodiment. The communication control device 100 may be configured to include a communication unit 102 and a controller 104.

The communication control device 100 may be configured to include a read only memory (ROM) (not shown), a random access memory (RAM) (not shown), a storage unit (not shown), an operation unit that is operated by the user (not shown), and a display unit for displaying various images on a display screen (not shown). The communication control device 100 may allow the components described above to be connected to each other via a bus used as a data transmission path.

The ROM (not shown) stores programs that is used by the controller 104 or data for control, such as operation parameters. The ROM (not shown) may temporarily store programs executed by the controller 104.

The storage unit (not shown) is a storage provided in the communication control device 100, and stores various data including a variety of applications and data related to the communication control method according to the present embodiment such as information related to prefetch. The storage unit (not shown) may include a magnetic recording medium such as hard disk and a nonvolatile memory such as flash memory. The storage unit (not shown) may be removable from the communication control device 100.

An example of the operation unit (not shown) includes an operation input device, which will be described later. An example of the operation unit (not shown) includes a display device, which will be described later.

[Hardware Configuration of Communication Control Device 100]

Figure 13:
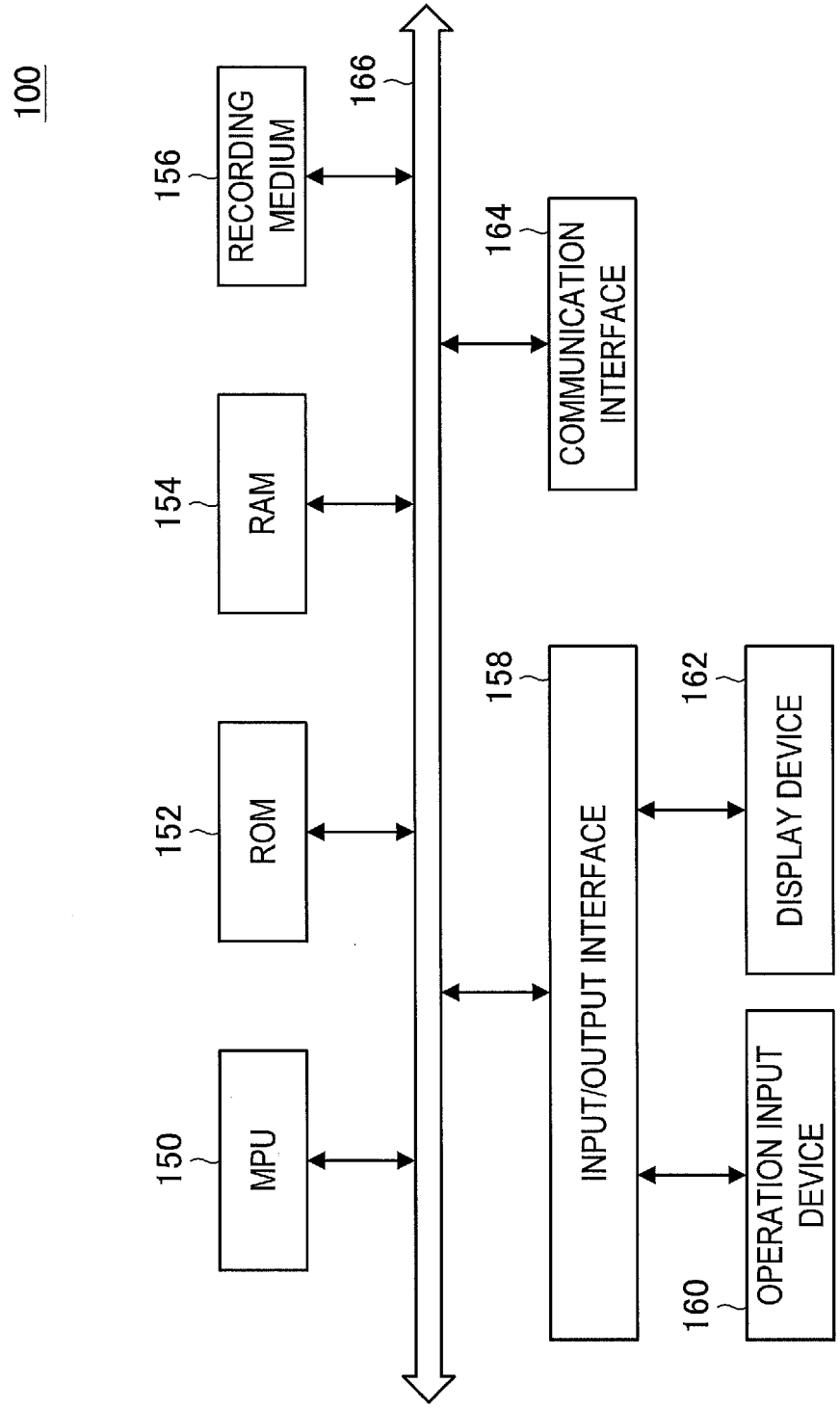
FIG. 13 is an explanatory diagram illustrated to describe an example of the hardware configuration of the communication control device according to the present embodiment.

FIG. 13 is an explanatory diagram illustrated to describe an example of the hardware configuration of the communication control device 100 according to the present embodiment. The communication control device 100 is configured to include an MPU 150, ROM 152, RAM 154, a recording medium 156, an input/output interface 158, an operation input device 160, a display device 162, and a communication interface 164. In the communication control device 100, the components are interconnected via a bus 166 used as a data transmission path.

The MPU 150 is configured to include one or more processors constituted by arithmetic circuits such as a micro processing unit (MPU), and various processing circuits. The MPU 150 functions as the control unit 104 for controlling the overall operation of the communication control device 100. The MPU 150 serves as a state determination unit 110, a prefetch control unit 112, and a management unit 114 described later, which are included in the communication control device 100.

The ROM 152 stores programs used by the MPU 150 and stores data for control such as operation parameters. The RAM 154 temporarily stores programs executed by the MPU 150.

The recording medium 156 functions as a storage unit (not shown), and stores various data including a variety of applications and data related to the communication control method according to the present embodiment such as information related to prefetch. The recording medium 156 includes, for example, a magnetic recording medium such as hard disk and a nonvolatile memory such as flash memory. The recording medium 156 may be removable from the communication control device 100.

The input/output interface 158 is connected to, for example, the operation input device 160 and the display device 162. The operation input device 160 functions as the operation unit (not shown). The display device 162 functions as a display unit (not shown). The display device 162 functions as a display unit (not shown). The input/output interface 158 includes, for example, a universal serial bus (USB) terminal, a digital visual interface (DVI) terminal, a high-definition multimedia interface (HDMI, registered trademark) terminal, and various processing circuits.

The operation input device 160 is provided, for example, on the communication control device 100, and is connected to the input/output interface 158 in the communication control device 100. The operation input device 160 includes, for example, buttons, direction keys, rotary selectors such as a jog dial, or combinations thereof.

The display device 162 is provided, for example, on the communication control device 100, and is connected to the input/output interface 158 in the communication control device 100. The display device 162 includes, for example, a liquid crystal display, an organic electro-luminescence (EL) display, or an organic light emitting diode (OLED) display.

The input/output interface 158 may be connected to an external device such as an external operation input device (for example, keyboards and mice) and an external display device as an external device of the communication control device 100. The display device 162 may be any device that is capable of performing display or operation by the user, such as touch-sensitive screen.

The communication interface 164 is a communication mechanism provided in the communication control device 100 and functions as a communication unit 102 for communicating with an external device via a network (or directly) wirelessly or through a wire. The communication interface 164 includes, for example, a communication antenna and radio frequency (RF) circuit (wireless communication), an IEEE802.15.1 port and transmitting/receiving circuit (wireless communication), an IEEE802.11 port and transmitting/receiving circuit (wireless communication), and a local area network (LAN) terminal and transmitting/receiving circuit (wire communication). The network according to the present embodiment includes, for example, a wire network such as LAN and wide area network (WAN), a wireless network such as wireless local area network (WLAN) and wireless wide area network (WWAN) via a base station, and the Internet using the communication protocol such as transmission control protocol/internet protocol (TCP/IP).

With the configuration shown in FIG. 13, the communication control device 100 performs processing performed by the communication control method according to the present embodiment. However, the hardware configuration of the communication control device 100 according to the present embodiment is not limited to the configuration shown in FIG. 13.

For example, the communication control device 100, when performing the communication with an external device via an external communication device connected to the communication control device 100, may be configured without the communication interface 164. The communication control device 100 may be configured without the recording medium 156, the operation input device 160, or the display device 162.

Referring again to FIG. 12, an example of the configuration of the communication control device 100 will be described. The communication unit 102 is a communication mechanism provided in the communication control device 100, and perform the communication with an external device via a network (or directly) wirelessly or through a wire. The communication unit 102 may perform the communication under the control of the controller 104.

An example of the communication unit 102 may include, but not limited to, a communication antenna and RF circuit or a LAN terminal and transmitting/receiving circuit. For example, the communication unit 102 may have a configuration that conforms to any specification capable of performing communication, such as a universal serial bus (USB) terminal and transmitting/receiving circuit, and a configuration that can communicate with an external device via a network.

The controller 104 is configured to include an MPU or the like, and serves to control the overall operation of the communication control device 100. The controller 104 may be configured to include the state determination unit 110, the prefetch control unit 112, and the management unit 114. The controller 104 plays a leading role in performing the process by the communication control method according to the present embodiment. The controller 104 may be configured to further include a communication control unit (not shown) for controlling the communication in the communication unit 102. In the controller 104, the prefetch control unit 112 may serve as the communication control unit (not shown).

The state determination unit 110 plays a leading role in performing the process of the above item (2) (state determination process). The state determination unit 110 determines whether it is in the state of performing the prefetch based on the communication state in the application in use (application being executed).

The prefetch control unit 112 plays a leading role in performing the process of the above item (1) (prefetch control process). When a communication for the application in use (application being executed) is performed in the connection state, the prefetch control unit 112 allows data corresponding to a target of processing to be prefetched through communication based on the information relating to prefetch of data. The prefetch control unit 112 performs any of the processes of the above items (i) to (v) based on the information relating to prefetch of data.

The prefetch control unit 112 selectively allows data to be prefetched based on the information relating to prefetch of data when it is determined to be in the state of performing the prefetch in the state determination unit 110 based on the determination result transmitted from the state determination unit 110.

The management unit 114 plays a leading role in performing the process of the above item (3) (management process), and manages the information relating to prefetch of data.

The controller 104 is configured to include the state determination unit 110, the prefetch control unit 112, and the management unit 114, and thus plays a leading role in performing the process by the communication control method according to the present embodiment.

The configuration of the communication control device 100 as shown in FIG. 12 allows the process performed by the communication control method according to the present embodiment (for example, the process of the above item (1) (prefetch control process) to the process of the above item (3) (management process)).

Thus, the configuration of the communication control device 100 as shown in FIG. 12 makes it possible to reduce the power consumed to maintain the connection state of being connected to an external device.

With the configuration as shown in FIG. 12, the communication control device 100 can achieve the effect obtained by performing the process of the communication control method according to the present embodiment as described above.

The configuration of the communication control device according to the present embodiment is not limited to the configuration shown in FIG. 12.

For example, the communication control device according to the present embodiment can be configured without one or both of the state determination unit 110 and the management unit 114 shown in FIG. 12.

Even when the communication control device is configured without one or both of the state determination unit 110 and the management unit 114, the communication control device according to the present embodiment allows data to be prefetched by the process of the above item (1) (prefetch control process). Thus, even when the communication control device is configured without one or both of the state determination unit 110 and the management unit 114, the communication control device according to the present embodiment can reduce the power consumed to maintain the connection state of being connected to an external device.

The communication control device according to the present embodiment may be configured to include one or more of the state determination unit 110, the prefetch control unit 112, and the management unit 114 shown in FIG. 12, as a separate component from the controller 104 (for example, implemented as separate processing circuit).

As described above, the process of the above item (1) (prefetch control process), the process of the above item (2) (state determination process), and the process of the above item (3) (management process) are divided, for the sake of convenience, from the process performed by the communication control method according to the present embodiment. Thus, the configuration for implementing the process of the communication control method according to the present embodiment is not limited to the state determination unit 110, the prefetch control unit 112, and the management unit 114 shown in FIG. 12, and may be the configuration in accordance with the method for dividing the process of the communication control method according to the present embodiment.

For example, when the communication related to the prefetch via an external communication device having the configuration and function similar to the communication unit 102, the communication control device according to the present embodiment may be configured without the communication unit 102.

The description is given by taking the communication control device as an exemplary embodiment, but the present embodiment is not limited to this example. The present embodiment can be applied to various devices that can control the prefetch of data through communication, such as a communication device including mobile phone or smartphone, a tablet device, a computer including personal computer (PC) and server, a display device, a video/music playback device (or video/music recording and playback device), and game consoles. The present embodiment may be applicable to integrated circuits (ICs) that can be incorporated into the equipment described above.

The present embodiment may be implemented by a system including a plurality of devices based on the connection to a network (or communication between devices) like, for example, cloud computing. That is, the communication control device according to the present embodiment may be implemented as, for example, a communication control system including a plurality of devices.

(Program According to Present Embodiment)

Program for causing a computer to function as the communication control device according to the present embodiment (for example, program capable of executing the process in accordance with the information processing method of the present embodiment, such as the process of the above (I), the process of the above (II), the process of the above (III), and the process of the above (IV)) is executed by a processor in the computer, and thus it is possible to reduce the power consumed to maintain the connection state of being connected to an external device.

Also, effects obtained by the process in accordance with the communication control method according to the present embodiment can be achieved by a program causing a computer to function as the communication control device according to the present embodiment being performed by a processor or the like in the computer.

It should be understood by those skilled in the art that various modifications, combinations, sub-combinations and alterations may occur depending on design requirements and other factors insofar as they are within the scope of the appended claims or the equivalents thereof.

For example, the foregoing description shows that a program (computer program) causing a computer to function as the communication control device according to the present embodiment is provided, but the present embodiment can provide an additional recording medium used to store the program.

The above configuration shows an example of the present embodiment and naturally comes under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) A communication control device including:

a prefetch controller configured to allow data corresponding to a target of processing to be prefetched through a communication based on information relating to a prefetch of data when a communication for an application being executed is performed in a connection state of being connected to an external device, the target of processing being different from the application being executed.

(2) The communication control device according to (1), wherein one or more of a band usage amount, a degree of effectiveness, a degree of priority, and a re-execution request value are set to the information relating to the prefetch for each target candidate of processing that is a target candidate of the target of processing, the band usage amount of the communication being necessary to perform the prefetch of data, the degree of effectiveness indicating how effective the prefetch is, the degree of priority indicating a priority order of the prefetch, the re-execution request value indicating whether the prefetch is to be performed repeatedly, and wherein the prefetch controller decides the target of processing from among the target candidates of processing and allows data corresponding to the decided target of processing to be prefetched based on the information relating to the prefetch.

(3) The communication control device according to (2), wherein, when the band usage amount is set to the information relating to the prefetch for each target candidate of processing, the prefetch controller determines whether data is prefetchable, decides a prefetch bandwidth value that is a bandwidth value available for the prefetch of data when the data is determined to be prefetchable, and decides, as the target of processing, the target candidate of processing to which the bandwidth usage amount not exceeding the decided prefetch bandwidth value is set.

(4) The communication control device according to (3), wherein the prefetch controller determines whether data is prefetchable, based on a value relating to a bandwidth of the communication for the application being executed.

(5) The communication control device according to (3) or (4), wherein the prefetch controller determines whether data is prefetchable, based on a history of a value relating to a bandwidth of the communication for the application being executed.

(6) The communication control device according to any one of (3) to (5), wherein the prefetch controller determines that data is prefetchable, when the communication for the application being executed is terminated.

(7) The communication control device according to any one of (3) to (6), wherein the prefetch controller decides the prefetch bandwidth value having a larger value in a stepwise manner.

(8) The communication control device according to (7), wherein the prefetch controller does not decide the prefetch bandwidth value having a larger value, when the bandwidth usage amount of the communication exceeds a predetermined threshold.

(9) The communication control device according to any one of (2) to (8),
wherein, when the degree of effectiveness is set to the information relating to the prefetch for each target candidate of processing, the prefetch controller decides, as the target of processing, the target candidate of processing having higher effectiveness of the prefetch indicated by the degree of effectiveness.

(10) The communication control device according to any one of (2) to (9),
wherein, when the degree of priority is set to the information relating to the prefetch for each target candidate of processing, the prefetch controller decides, as the target of processing, the target candidate of processing having higher priority order of the prefetch indicated by the degree of priority.

(11) The communication control device according to any one of (2) to (10),
wherein, when the re-execution request value is set to the information relating to the prefetch for each target candidate of processing, the prefetch controller does not decide the target candidate of processing to which the re-execution request value indicating no prefetch repeatedly performed from among the target candidates of processing in which the prefetch of data has already been performed is set.

(12) The communication control device according to any one of (1) to (11),
wherein the prefetch controller allows the prefetch of data to be stopped, based on a value relating to a bandwidth of the communication.

(13) The communication control device according to any one of (1) to (12), further including:
a state determination unit configured to determine whether the prefetch is in a state of being performed, based on a state of the communication for the application being executed,
wherein, when the prefetch is determined to be in a state of being performed, the prefetch controller allows data to be selectively prefetched, based on the information relating to the prefetch.

(14) The communication control device according to any one of (1) to (13), further including:
a management unit configured to manage the information relating to the prefetch.

(15) The communication control device according to (14),
wherein a degree of effectiveness is set to the information relating to the prefetch for each target candidate of processing that is a candidate for performing the prefetch of data, the degree of effectiveness indicating how effective the prefetch is, and
wherein the management unit updates the degree of effectiveness set to the information relating to the prefetch.

(16) The communication control device according to (15),
wherein the management unit updates the degree of effectiveness set to the information relating to the prefetch, based on a use history of prefetched data.

(17) The communication control device according to (15) or (16),
wherein the management unit updates the degree of effectiveness set to the information relating to the prefetch into a weighted degree of effectiveness, based on a frequency of the communication for an access to data of the target candidate of processing.

(18) A communication control method that is executed by a communication control device, the method including:
allowing data corresponding to a target of processing to be prefetched through a communication based on information relating to a prefetch of data when a communication for an application being executed is performed in a connection state of being connected to an external device, the target of processing being different from the application being executed.

(19) A non-transitory computer-readable recording medium having a program recorded thereon, the program causing a computer to execute the function of:
allowing data corresponding to a target of processing to be prefetched through a communication based on information relating to a prefetch of data when a communication for an application being executed is performed in a connection state of being connected to an external device, the target of processing being different from the application being executed.

What is claimed is:

1. A communication control device, comprising:
a prefetch controller configured to cause prefetch of data corresponding to a target of processing through a communication, wherein the prefetch is based on information related to the prefetch of the data,
wherein the communication is established for an application in use based on a connection state with an external device, and
wherein the target of processing is different from the application in use; and
determine that the data is prefetchable based on a value related to a bandwidth of the communication for the application in use.

2. The communication control device according to claim 1,
wherein at least one of a band usage amount, an index that indicates reduction of power consumption through the prefetch, a degree of priority, or a re-execution request value is set to the information related to the prefetch for each target candidate of the target of processing,
wherein the band usage amount of the communication is necessary for the prefetch of the data,
wherein the degree of priority indicates a priority order of the prefetch,
wherein the re-execution request value indicates whether the prefetch is to be repeated, and
wherein the prefetch controller is further configured to:
determine the target of processing from among target candidates of processing, and
cause the prefetch of the data corresponding to the determined target of processing based on the information related to the prefetch.

3. The communication control device according to claim 2,
wherein, based on the band usage amount that is set to the information related to the prefetch for each target candidate, the prefetch controller, is further configured to:
determine a prefetch bandwidth value that is a bandwidth value available for the prefetch of the data based on a determination that the data is prefetchable, and
determine, as the target of processing, the target candidate to which the band usage amount lower than the determined prefetch bandwidth value is set.

4. The communication control device according to claim 3,
wherein the prefetch controller is further configured to determine that the data is prefetchable, based on a history of the value related to the bandwidth of the communication for the application in use.

5. The communication control device according to claim 3,
wherein the prefetch controller is further configured to determine that the data is prefetchable, based on a termination of the communication for the application in use.

6. The communication control device according to claim 3,
wherein the prefetch controller is further configured to determine the prefetch bandwidth value in a stepwise manner.

7. The communication control device according to claim 6,
wherein the prefetch controller is further configured to stop the determination of the prefetch bandwidth value based on the band usage amount of the communication exceeding a threshold.

8. The communication control device according to claim 2,
wherein the prefetch controller is further configured to determine, as the target of processing, the target candidate based on the index that indicates the reduction of the power consumption through the prefetch.

9. The communication control device according to claim 2,
wherein, based on the degree of priority that is set to the information related to the prefetch for each target candidate of processing, the prefetch controller is further configured to determine, as the target of processing, the target candidate that has a higher priority order of the prefetch indicated by the degree of priority.

10. The communication control device according to claim 2,
wherein, based on the re-execution request value that is set to the information related to the prefetch for each target candidate, the prefetch controller stops the determination of the target candidate to which the re-execution request value is set, the re-execution request value indicates no repeated prefetch from among the target candidates in which the data has already been prefetched.

11. The communication control device according to claim 1,
wherein the prefetch controller is further configured to stop the prefetch of the data, based on the value related to the bandwidth of the communication for the application in use.

12. The communication control device according to claim 1, further comprising:
a state determination unit configured to determine that the data is currently prefetched, based on a state of the communication for the application in use,
wherein, based on the determination that the data is currently prefetched, the prefetch controller is further configured to cause the data to be selectively prefetched, based on the information related to the prefetch.

13. The communication control device according to claim 1, further comprising:
a management unit configured to manage the information related to the prefetch.

14. The communication control device according to claim 13,
wherein an index related to reduction of power consumption through the prefetch is set to the information related to the prefetch for each target candidate for the prefetch of the data, and
wherein the management unit is further configured to update the the index set to the information related to the prefetch.

15. The communication control device according to claim 14,
wherein the management unit is further configured to update the index set to the information related to the prefetch, based on a use history of the prefetched data.

16. The communication control device according to claim 14,
wherein the management unit is further configured to update the index set to the information related to the prefetch, based on a frequency of the communication for an access to the data of the target candidate.

17. The communication control device according to claim 1, wherein the value related to the bandwidth includes previous bandwidth usage rate, and wherein the prefetch controller is further configured to determine that the data is prefetchable based on a determination that the previous bandwidth usage rate of the communication for the application in use is less than a threshold.

18. A communication control method, comprising:
in a communication control device:
causing prefetch of data corresponding to a target of processing through a communication,
wherein the prefetch is based on information related to the prefetch of the data,
wherein the communication is established for an application in use based on a connection state with an external device, and
wherein the target of processing is different from the application in use; and
determining that the data is prefetchable based on a value related to a bandwidth of the communication for the application in use.

19. A non-transitory computer-readable storage medium having stored thereon, computer-executable instructions that when executed by a computer, cause the computer to execute operations, the operations comprising:
causing prefetch of data corresponding to a target of processing through a communication,
wherein the prefetch is based on information related to the prefetch of the data,
wherein the communication is established for an application in use based on a connection state with an external device, and
wherein the target of processing is different from the application in use; and
determining that the data is prefetchable based on a value related to a bandwidth of the communication for the application in use.

* * * * *